US010009554B1

(12) United States Patent
Miao et al.

(10) Patent No.: US 10,009,554 B1
(45) Date of Patent: Jun. 26, 2018

(54) METHOD AND SYSTEM FOR USING LIGHT EMISSION BY A DEPTH-SENSING CAMERA TO CAPTURE VIDEO IMAGES UNDER LOW-LIGHT CONDITIONS

(71) Applicant: Lighthouse AI, Inc., Palo Alto, CA (US)

(72) Inventors: Xiaoyu Miao, Palo Alto, CA (US); Daniel Yum, Santa Cruz, CA (US); Zachary Lawrence Brand, Sunnyvale, CA (US); Hendrik Dahlkamp, Palo Alto, CA (US)

(73) Assignee: Lighthouse AI, Inc., Palo Alto, CA (US)

( * ) Notice: Subject to any disclaimer, the term of this patent is extended or adjusted under 35 U.S.C. 154(b) by 0 days. days.

(21) Appl. No.: 15/442,290

(22) Filed: Feb. 24, 2017

(51) Int. Cl.
| *H04N 7/18* | (2006.01) |
| *H04N 5/33* | (2006.01) |
| *G06T 7/50* | (2017.01) |
| *H04N 5/235* | (2006.01) |
| *H04N 5/04* | (2006.01) |
| *H04N 5/225* | (2006.01) |
| *G01B 11/22* | (2006.01) |
| *G01B 11/25* | (2006.01) |

(52) U.S. Cl.
CPC ............ *H04N 5/33* (2013.01); *G01B 11/22* (2013.01); *G01B 11/25* (2013.01); *G06T 7/50* (2017.01); *H04N 5/04* (2013.01); *H04N 5/2256* (2013.01); *H04N 5/2353* (2013.01)

(58) Field of Classification Search
CPC ........................................................ H04N 5/33
See application file for complete search history.

(56) References Cited

U.S. PATENT DOCUMENTS

| 6,348,302 | B1* | 2/2002 | Kosugi | G03C 5/04 |
| | | | | 430/350 |
| 2008/0158348 | A1* | 7/2008 | Karpen | A61B 1/00036 |
| | | | | 348/82 |
| 2009/0099761 | A1* | 4/2009 | Davis | G08G 5/0026 |
| | | | | 701/120 |
| 2011/0317005 | A1* | 12/2011 | Atkinson | G01S 17/023 |
| | | | | 348/135 |
| 2012/0229674 | A1* | 9/2012 | Solomon | H04N 5/772 |
| | | | | 348/231.99 |
| 2014/0072211 | A1* | 3/2014 | Kovesi | G06T 7/90 |
| | | | | 382/164 |

* cited by examiner

*Primary Examiner* — Md Haque
(74) *Attorney, Agent, or Firm* — Chamberlain, Hrdlicka, White, Williams & Aughtry

(57) ABSTRACT

In general, embodiments of the invention relate to a method for capturing video frames. The method includes obtaining a depth-data frame of an environment using a depth-sensing camera and an infrared illuminator, where the environment is illuminated by an illumination pattern emitted by the infrared illuminator, obtaining, an infrared illuminator parameterization for the illumination pattern emitted by the infrared illuminator, obtaining a desired frame exposure time, based on a desired frame exposure, determining, based on the infrared illuminator parameterization and the desired frame exposure time, an actual frame exposure time, and after determining the actual frame exposure time, obtaining a frame of the environment using the actual frame exposure time using the infrared illuminator with the illumination pattern.

20 Claims, 6 Drawing Sheets

METHOD AND SYSTEM FOR USING LIGHT EMISSION BY A DEPTH-SENSING CAMERA TO CAPTURE VIDEO IMAGES UNDER LOW-LIGHT CONDITIONS

BACKGROUND

Computer vision increasingly relies on depth data. A video camera and a depth-sensing camera may, thus, be paired to obtain a three-dimensional color or grayscale image of an environment. Depth-sensing may require active illumination by, for example, one or more infrared illuminators.

SUMMARY

In general, in one aspect, the invention relates to a method for capturing video frames. The method includes obtaining a depth-data frame of an environment using a depth-sensing camera and an infrared illuminator, wherein the environment is illuminated by an illumination pattern emitted by the infrared illuminator, obtaining, an infrared illuminator parameterization for the illumination pattern emitted by the infrared illuminator, obtaining a desired frame exposure time, based on a desired frame exposure, determining, based on the infrared illuminator parameterization and the desired frame exposure time, an actual frame exposure time, and after determining the actual frame exposure time, obtaining a frame of the environment using the actual frame exposure time using the infrared illuminator with the illumination pattern.

In general, in one aspect, the invention relates to a system for capturing video frames. The system includes a depth-sensing camera, an infrared illuminator configured to emit an illumination pattern that illuminates an environment, enabling the capturing of a depth-data frame by the depth-sensing camera, an imaging control engine configured to: obtain an infrared illuminator parameterization of the infrared illuminator, obtaining a desired frame exposure time, based on a desired frame exposure, determine, based on the infrared illuminator parameterization and the desired frame exposure time, an actual frame exposure time, and a video camera configured to obtain a frame using the actual frame exposure time, using the infrared illuminator with the illumination pattern.

In general, in one aspect, the invention relates to a non-transitory computer-readable medium (CRM) comprising instructions that enable a system for capturing video frames to obtain a depth-data frame of an environment using a depth-sensing camera and an infrared illuminator, wherein the environment is illuminated by an illumination pattern emitted by infrared illuminator, obtain a desired frame exposure time, based on a desired frame exposure, determine, based on the infrared illuminator parameterization and the desired frame exposure time, an actual frame exposure time, and after determining the actual frame exposure time, obtain a frame using the actual frame exposure time using the infrared illuminator with the illumination pattern.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems that include a video camera and a depth-sensing camera and methods for using a light source of the depth-sensing camera to illuminate frames captured by the video camera. More specifically, one or more embodiments of the invention enable the capturing of frames, by the video camera, under lighting conditions that require additional illumination, without a need for a dedicated video camera light source. Embodiments of the invention, instead, enable the use of light emitted by an illuminator of the depth sensing camera. The light, provided by the illuminator, may be emitted using a temporal pattern required by the depth-sensing camera's measurement principle. For example, the emitted light may be pulsed. In one or more embodiments of the invention, the temporal pattern of the emitted light enables the video camera to avoid artifacts in the captured frames.

Figure 1:
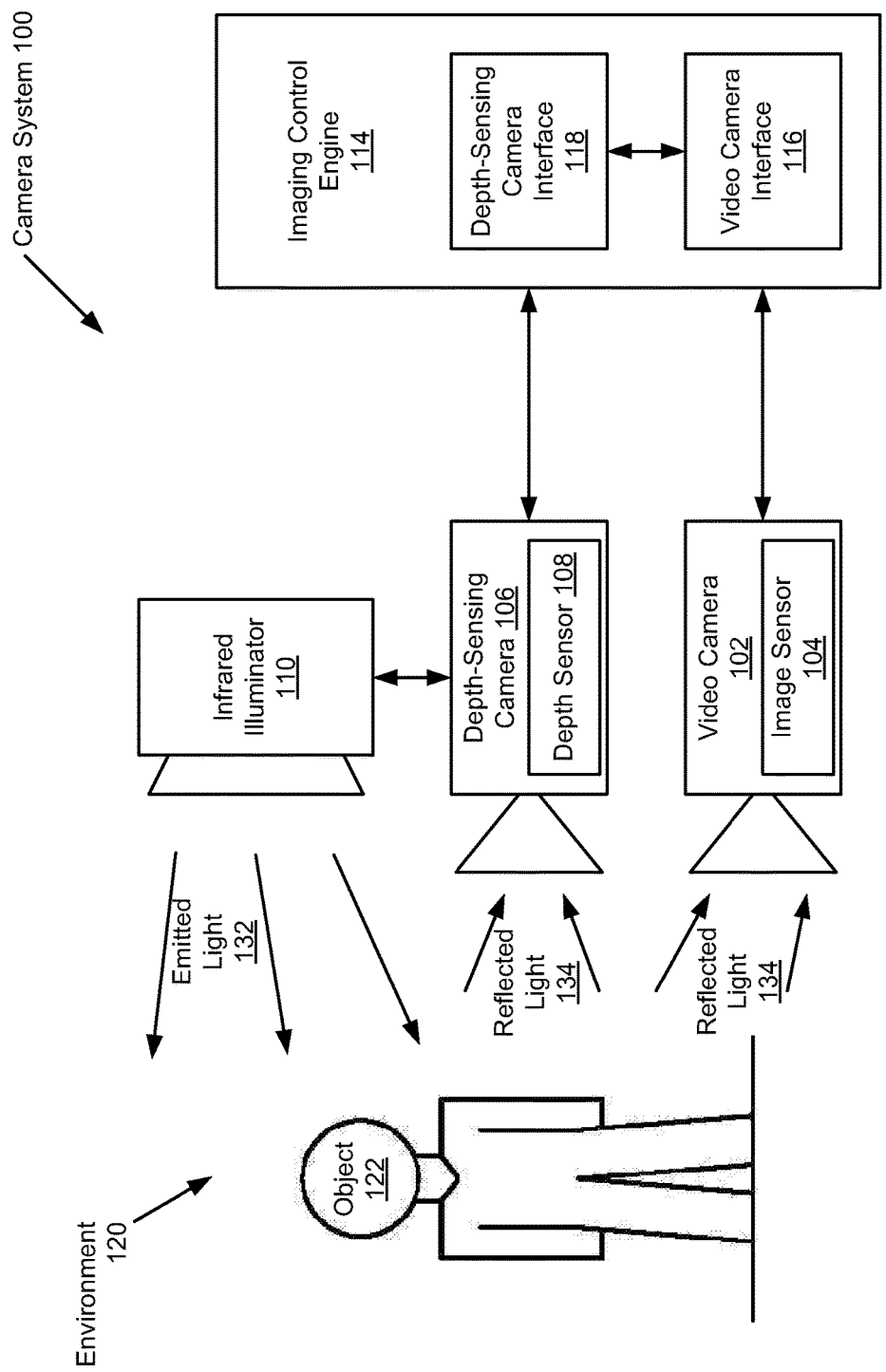
FIG. 1 shows a camera system, in accordance with one or more embodiments of the invention.

FIG. 1 shows a camera system (100), in accordance with one or more embodiments of the invention. The camera system may be used to capture data in an environment (120). The environment (120) may be a three-dimensional space that is within the field of view of the camera system (100). The environment (120) may be any kind of environment, e.g., an indoor or outdoor environment. The environment (120) may include one or more objects (122). An object may be anything that can be imaged by the camera system (100).

In one or more embodiments of the invention, the camera system (100) includes a video camera (102) and a depth sensing camera (106). The depth sensing camera, in accordance with an embodiment of the invention, is equipped with an infrared (IR) illuminator (110). Further, an imaging control engine (114) interfaces with the video camera (102) and the depth sensing camera (106). Each of these components is subsequently described.

The camera system (100) may be a portable unit that may be positioned such that the field of view of the video camera (102) and the depth-sensing camera covers an area of interest in the environment (120). The camera system (100) may be placed, for example, on a shelf, on a tripod, or on a bracket mounted on a wall or a ceiling. Other locations of the camera system (100) may be used without departing from the invention. A single housing of the camera system (100) may accommodate the video camera (102), the depth-sensing camera (106), the IR illuminator (110) and the imaging control engine (114), or one or more of these components may be separately accommodated.

The video camera (102) of the camera system (100) may be any type of camera that is capable of capturing two-dimensional image frames in the environment (120). The video camera (102) may include an image sensor (104), for example, an RGB or CMYG color or grayscale CCD or CMOS sensor with a spatial resolution of, for example, 320×240 pixels. Those skilled in the art will appreciate that the invention is not limited to the aforementioned image sensor technologies, temporal, and/or spatial resolutions. In one or more embodiments of the invention, the shutter speed and/or the frame rate of the video camera is externally controllable. Thus, the exposure of a captured frame may be controlled by specifying an exposure time (or shutter speed), e.g., via the video camera interface (116). A longer exposure time (slower shutter speed) may be used to capture darker scenes and a shorter exposure time (faster shutter speed) may be used to capture brighter scenes. Further, in one embodiments of the invention, the capturing of a frame may be externally triggered, e.g. by a pulse signal provided by the video camera interface (116). The external sync signal may thus be used to control the timing of frames being captured, i.e., the frame rate. Different frame rates may be obtained, depending on the frequency of the external sync signal. The video camera may further be capable of determining an appropriate shutter speed without requiring an external input. Further, the video camera may also support a free running mode which enables the camera to capture frames at an internally specified frame rate, thus not requiring an external sync signal.

In one embodiment of the invention, the video camera (102) is sensitive to wavelengths in the infrared (IR) spectrum. The video camera may thus be used in dark environments that are invisibly illuminated using an IR illuminator. While not shown in FIG. 1, the video camera (102) may include an IR cut filter. The IR cut filter may block infrared light during regular daylight operating conditions. The IR cut filter may thus improve color representation under daylight operating conditions. When insufficient light for daylight operation is detected, the IR cut filter may be disabled to allow IR light emitted, e.g., by an IR illuminator, to pass. A grayscale image may thus be obtained by the camera in a dark environment. More specifically, the IR illuminator (110), further described below, may emit IR light (132). The IR light may be reflected by objects (122) in the environment (120). The reflected IR light (134) may then be received by the image sensor (104) of the video camera. Image frames may thus be generated by the video camera (102) based on the reflected IR light (134). In contrast, during daylight operating conditions, the IR cut filter may block the reflected IR light, such that the image frames generated by the video camera are purely based on the visible spectrum of light.

While not shown in FIG. 1, the video camera may include components in addition to the image sensor. For example, the video camera may include optical elements that guide incoming light to the image sensor (104), and electronic circuits that process signals obtained from the image sensor (104) to provide them to a video camera interface (116). The processing may involve analog and digital processing, compression, format conversion, buffering, etc.

In one embodiment of the invention, the camera system (100) further includes a depth-sensing camera (106) that may be capable of reporting depth values from the monitored environment (120). For example, the depth-sensing camera (106) may provide depth measurements for a set of 320×240 pixels (Quarter Video Graphics Array (QVGA) resolution) at a temporal resolution of 30 frames per second (fps). The depth-sensing camera (106) may be based on scanner-based or scannerless depth measurement techniques such as, for example, LIDAR, using time-of-flight measurements to determine a distance to an object in the field of view of the depth-sensing camera (106). The depth sensor (108) of the depth-sensing camera may, however, be based on any depth-sensing technology, without departing from the invention. The field of view and the orientation of the depth sensing camera may be selected to cover a portion of the monitored environment (120) similar (or substantially similar) to the portion of the monitored environment captured by the video camera.

While not shown in FIG. 1, the depth-sensing camera may include components in addition to the depth sensor (108). For example, the depth-sensing camera may include optical elements that guide incoming light to the depth sensor (108), and electronic circuits that process signals obtained from the depth sensor (108) to provide them to a depth-sensing camera interface (118). The processing may involve analog and digital processing, compression, format conversion, buffering, etc. The depth sensing camera may further include an interface to the IR illuminator (110) to control the illumination pattern to be emitted by the IR illuminator.

In one embodiment of the invention, the camera system (102) further includes the infrared (IR) illuminator (110). The IR illuminator may operate at a wavelength of, for example, 850 nm (near invisible) or 940 nm (invisible) and may be functionally coupled to the depth-sensing camera (106). The infrared illuminator's primary purpose may be to provide an illumination pattern necessary for the function of the depth-sensing camera (106). Accordingly, the nature of the illumination pattern may be specific to the operating principle of the depth-sensing camera and may include temporal and/or spatial modulations of the emitted light (132). Characteristics of the emitted light are further described in FIG. 2. Depending on the configuration and the use of the camera system (100), one or more IR illuminators (110) may be used to illuminate the environment (120).

In one or more embodiments of the invention, the video camera (102) is configured such that it benefits from the illumination of the environment (120) by the emitted light (132), thus capturing reflected light (134), e.g., the emitted light (132) reflected by an object (122) in the environment (120). Accordingly, the video camera (102) may be operated in dark environments without requiring a dedicated light source. In one or more embodiments of the invention, the video camera (102) is parameterized to specifically consider the modulation of the light emitted by the IR illuminator (110) to avoid artifacts in the images provided by the video camera. The methods that enable the camera system (100) to consider the modulation of the light emitted by the IR illuminator (110) are described in FIGS. 3 and 4.

In one embodiment of the invention, the camera system (102) includes an imaging control engine (114). The imaging control engine may control the operation of the video camera (102) and/or the depth-sensing camera (106), e.g., by parameterizing the video camera and/or the depth-sensing camera. Specifically, the imaging control engine, in accordance with one or more embodiments of the invention, may coordinate the interplay between the illumination provided by the IR illuminator (110) of the depth-sensing camera (106) and the frame capturing by the video camera (102) to enable the capturing of artifact-free frames by the video camera (102), while relying on the IR illuminator (110) as the primary source of light. The imaging control engine (114) may include a video camera interface (116) and a depth-sensing camera interface (118) to enable parameterization of the cameras. These interfaces may further be relied upon for the receiving of image and depth data from the video camera (102) and the depth-sensing camera (106), respectively. The imaging control engine (114) may be executed on a computing device (not shown in FIG. 1) similar to the exemplary computing device shown in FIG. 6. Any combination of mobile, desktop, server, embedded, or other types of hardware may be used to implement the computing device. For example, the computing device may be a system on a chip (SOC), i.e., an integrated circuit (IC) that integrates all components of the computing device into a single chip. The SOC may include one or more processor cores, associated memory (e.g., random access memory (RAM), cache memory, flash memory, etc.), a network interface (e.g., a local area network (LAN), a wide area network (WAN) such as the Internet, mobile network, or any other type of network) via a network interface connection, and interfaces to storage devices, input and output devices, etc. The computing device may further include one or more storage device(s) (e.g., a hard disk, an optical drive such as a compact disk (CD) drive or digital versatile disk (DVD) drive, a flash memory stick, etc.), and numerous other elements and functionalities. In one embodiment of the invention, the computing device includes an operating system (e.g., Linux) that may include functionality to execute the methods further described below. Those skilled in the art will appreciate that the invention is not limited to the aforementioned configuration of the computing device. In one embodiment of the invention, the computing device may be integrated with the video camera (102) and/or the depth sensing camera (106). Alternatively, the computing device may be detached from the video camera (102) and/or the depth sensing camera (106), and may be using wired and/or wireless connections to interface with the video camera (102) and/or the depth sensing camera (106).

The components of the camera system (100), i.e., the video camera (102), the depth-sensing camera (106), the imaging control engine (114) and other components that may interface with the camera system (100) may communicate using any combination of wired and/or wireless communication protocols via local area networks and/or wide area networks (e.g., over the Internet). The manner in which these communications are performed may vary based on the implementation of the invention.

One skilled in the art will recognize that the camera system is not limited to the configuration described above. For example, any kind of depth-sensing camera technology and any kind of video recording technology may be employed without departing from the invention. These technologies may have specification that deviate from the above described configuration. For example, the imaging may be performed at any wavelength or wavelength band, and similarly, the wavelength of the light emitted by the illuminator(s) may deviate from the above description without departing from the invention.

Figure 2:
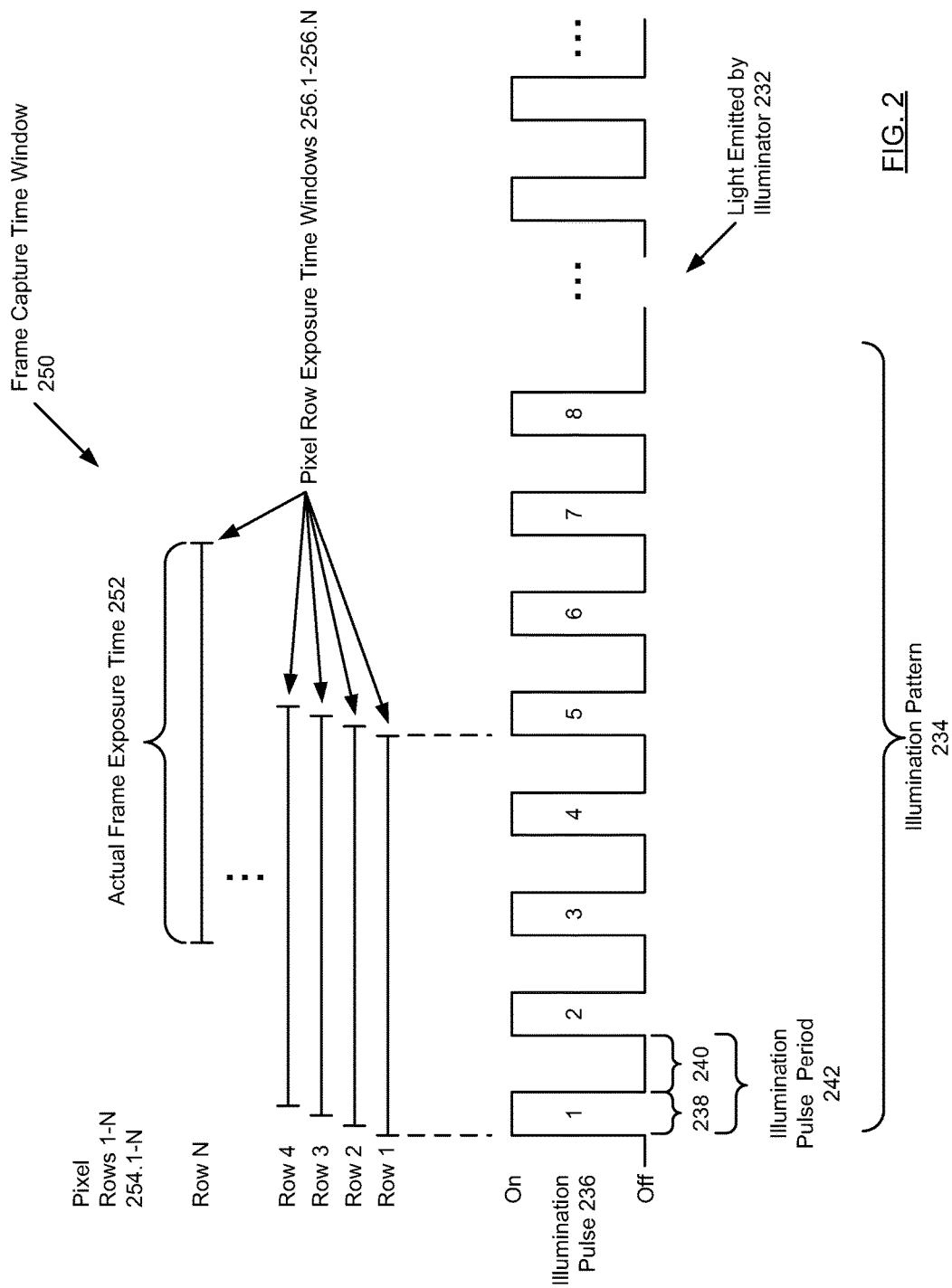
FIG. 2 shows an exemplary timing of the capturing of a frame, in accordance with one or more embodiments of the invention.

FIG. 2 shows an exemplary timing of the capturing of a frame, in accordance with one or more embodiments of the invention. More specifically, FIG. 2 shows light emitted by the illuminator of the depth-sensing camera. The light is emitted based on an illumination pattern (234). The illumination pattern may be specific to the depth-sensing technology relied upon by the depth-sensing camera (106). The exemplary illumination pattern (234) in FIG. 2 includes a pulse train of eight rectangular illumination light pulses (collectively, 236). Each of these pulses is characterized by an illumination pulse on-time (238), an illumination pulse off-time (240) and an illumination pulse period (242) where the illumination pulse period is the sum of the illumination pulse on-time and the illumination pulse off-time. Assume, for example, that light is emitted for 1 ms (illumination pulse on-time), followed by a 1.6 ms pause (illumination pulse off-time), then the illumination pulse period (242) is 2.6 ms. In the example, the duration of the illumination pattern is, therefore, 20.8 ms. There may be period of time following the illumination pattern (not shown) (also referred to as a "pause"), which may occur before the illumination pattern (234) repeats. In one embodiment of the invention, the pause may be 10 ms. However, the invention is not limited to embodiments that include a pause and/or that include a pause of 10 ms.

FIG. 2 further shows a frame capture time window (250) during which the capturing of a frame, in temporal alignment with the illumination pattern is completed. In one embodiment of the invention, a video or image frame is acquired pixel row by pixel row. Rows of pixels are sequentially read out, and, accordingly, pixel rows 1-N (254.1-254.N) may not be acquired at once, but with a slight temporal offset, as illustrated in FIG. 2. While each row of pixels may experience the same actual frame exposure time (252), the alignment of the pixel row exposure time window (256) during which a row of pixels is exposed to the light emitted by the illuminator differs from pixel row to pixel row.

In one embodiment of the invention, the actual frame exposure time (252) is a multiple of the illumination pulse period. In the exemplary frame capture time window (250), shown in FIG. 2, the actual frame exposure time (252) is 10.4 ms, corresponding to four illumination pulse periods (238). In the example shown in FIG. 2, the actual frame exposure time may be any multiple of the illumination pulse period, ranging from 2.6 ms (one illumination pulse period) to 18.2 ms (seven illumination pulse periods). It is, however, important to note that due to the square wave-like illumination pattern, the exposure of the camera sensor to light is not uniform over time. In the example shown in FIG. 2, light is only received during the illumination pulse on-time of 1 ms. Accordingly, if the actual frame exposure time spans four illumination pulse periods, light from the illuminator is received for 4 ms, assuming that there is no additional background light. If additional background light exists (e.g., moonlight in an otherwise dark environment), then this light is received in addition to the light emitted during the illumination pulse on-time.

In one embodiment of the invention, the actual frame exposure time (242) is limited to multiples of the illumination pulse period (242) to ensure that the exposure to light from the illuminator for each pixel row (244) is identical. Embodiments of the invention ensure a uniform exposure for all pixel rows, as subsequently described.

Consider the exemplary scenario shown in FIG. 2. The beginning of the pixel row exposure time window (256.1) for the first row of pixels (254.1) is aligned with the beginning of the first illumination pulse period. Further, the end of pixel row exposure time window (256.1) for the first row of pixels (254.1) is aligned with the end of the fourth illumination pulse period. Accordingly, the readout of the pixels of the first row of pixels is based on light associated with light pulses 1-4. The total on-time (illuminator active) is thus 4×1 ms=4 ms. While the actual frame exposure time (252) for the second row of pixels (244.2) is identical to the actual frame exposure time for the first row of pixels, the second row of pixels is read out with a slight temporal offset, as shown in FIG. 2. Accordingly, the beginning of the pixel row exposure time window (256.2) for the second row of pixels (254.2) is slightly delayed relative to the beginning of the first illumination pules period. Accordingly, not all light provided during the first illumination pulse is captured. However, the pixel row exposure time window (256.2) of the second row of pixels (254.2) slightly overlaps the fifth illumination pulse by the same duration. Accordingly, the light not received by missing the onset of the first illumination pulse is compensated for by the light received during the fifth illumination pulse. Accordingly the total illumination pulse on-time (illuminator active) for the second row of pixels also equals 4 ms. The process is similar for all rows of pixels of the image sensor, and all rows of pixels therefore experience the same aggregate on-time of the illuminator, in accordance with one or more embodiments of the invention. No change (or substantially no change) in brightness, resulting from uneven exposure to illuminator light for different rows of pixels is therefore experienced in image frames obtained from the image sensor.

Those skilled in the art will recognize that while FIG. 2 shows an actual frame exposure time (242) that spans four illumination pulse periods, the actual frame exposure time (242) may span any number of illumination pulse periods ranging from a single illumination pulse period to M−1 illumination pulse periods, where M is the number of pulse periods in the illumination pattern. The actual frame exposure time (242) may not span M illumination pulse periods because, with no illumination pulse M+1 existing, a shift of the pixel row exposure time window from pixel row to pixel row would result in a reduced total on-time experience during the actual frame exposure time for any pixel row except for the first pixel row. Accordingly, one requirement may be that the pixel row exposure time window for the last row of pixels ends at or before the end of the last illumination pulse. Methods for determining the proper actual frame exposure time, based on these constraints, are described in FIGS. 3 and 4.

Figure 3:
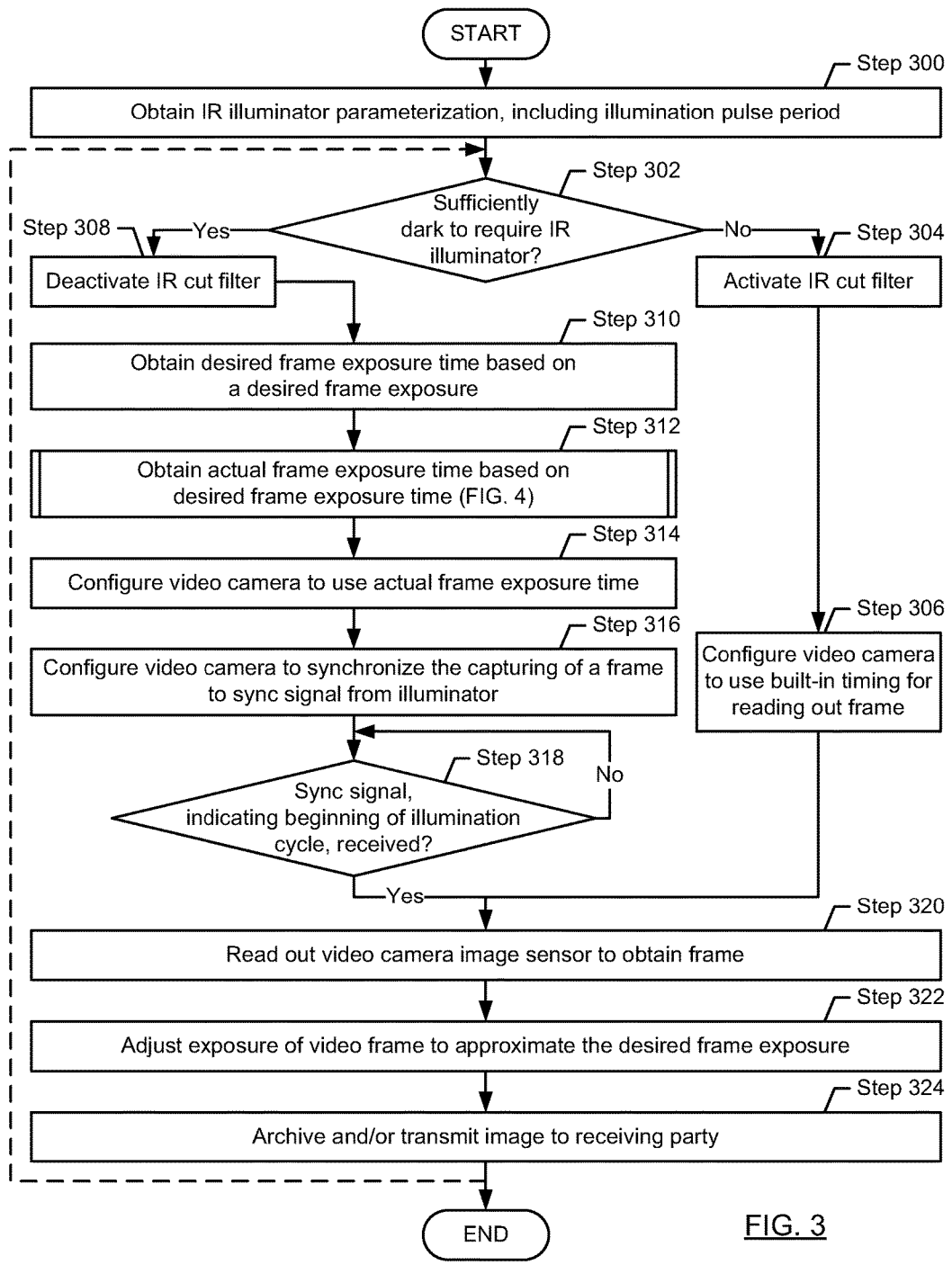
FIGS. 3 and 4 show flowcharts describing methods for capturing frames, in accordance with one or more embodiments of the invention.
Figure 4:
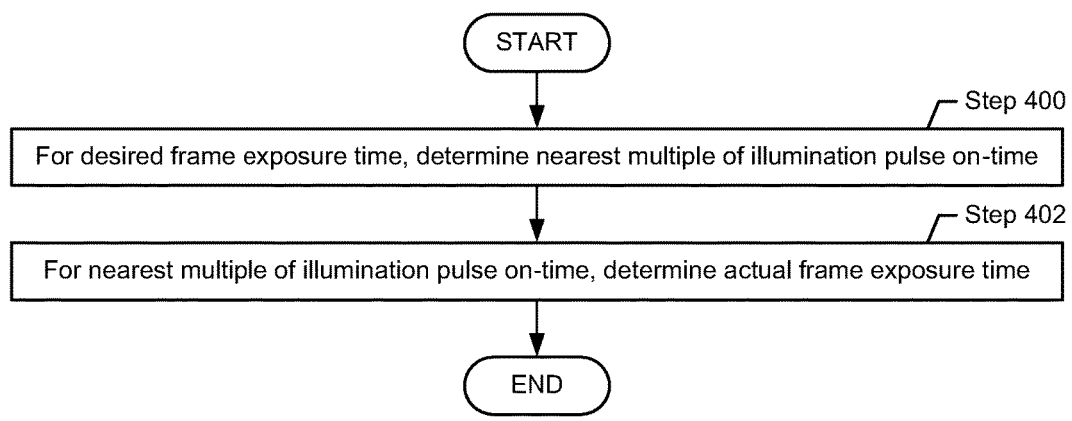

FIGS. 3 and 4 show flowcharts in accordance with one or more embodiments of the invention. While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 3 and 4 may be performed in parallel with any other steps shown in FIGS. 3 and 4 without departing from the invention.

FIG. 3 shows a method for using illumination provided by a depth camera illuminator to capture frames under low-light conditions, in accordance with one or more embodiments of the invention. The method also includes steps that enable the capturing of frames under regular light conditions, i.e., when sufficient light is available to enable the camera to operate in a day-time operating mode. The steps in FIG. 3 may be performed by the image control engine, and the video camera that interfaces with the image control engine via the video camera interface. While the method of FIG. 3 is executing, the depth sensing camera may be separately and independently acquiring depth image frames. Although the acquisition of depth image frames may not be controllable by the method described in FIG. 3, the method of FIG. 3 has access to the timing of the depth image acquisition via synchronization signals, and further, the parameterization of the depth-sensing camera, in particular the parameters that establish the timing of the illumination pattern, are accessible by the method described in FIG. 3.

Turning to FIG. 3, in Step 300, the parameterization of the IR illuminator associated with the depth-sensing camera is obtained. The variables obtained include at least the illumination pulse on-time, the illumination pulse period, and the number of illumination pulses per illumination pattern.

In Step 302, a determination is made about whether lighting condition require the camera system to rely on light provided by the infrared illuminator. In one embodiment of the invention, an ambient light sensor may be used to quantify the current lighting conditions in order to make the determination in step 302. If a determination is made that the environment is sufficiently bright, thus making IR illumination unnecessary, the method may proceed to Step 304.

In Step 304, the IR cut filter is activated. Thus, IR light, including the light emitted by the IR illuminator is prevented from reaching the image sensor of the video camera. In Step 306 the video camera is configured to use its built-in timing for obtaining frames. In other words, the video camera is configured to be free-running, thus not requiring an external trigger for capturing a frame. The video camera may determine an appropriate exposure time using built-in algorithms.

Returning to Step 302, if a determination is made that the ambient light is insufficient for capturing frames, thus necessitating IR illumination, the method may proceed to Step 308.

In Step 308, the IR cut filter is deactivated, thus allowing IR light to reach the image sensor of the video camera.

In Step 310, a desired exposure time is obtained. The desired exposure time may be obtained in various ways. Specifically, because the choice of the exposure time affects the brightness of the image to be taken, i.e. the exposure, the desired exposure time may be set based on a desired image exposure. The desired image exposure may be chosen for the entire image to obtain an average desired image exposure. Alternatively, the image exposure may be chosen for a particular image region, for example for an object identified in the image, as further described in the use case below. In one embodiment of the invention, the desired exposure time is incrementally determined. A previously captured frame or multiple previously captured frames may be analyzed for exposure, and based on the detected exposure, e.g., assessed by averaging individual pixel brightness values, the desired exposure time may be upward or downward adjusted. The obtained desired exposure time is a quantity that corresponds to a time interval measured, e.g., in milliseconds.

In Step 312, the actual frame exposure time, to be used by the camera when capturing a frame, is determined. In one embodiment of the invention, the actual frame exposure time is set to approximate the desired frame exposure time obtained in Step 310, as further described in FIG. 4.

In Step 314, the video camera is configured to use the actual frame exposure time, obtained in Step 312, and in Step 316, the video camera is configured to synchronize the capturing of a frame to a sync signal that indicates the beginning of the first illumination pulse of an illumination pattern based on which light is emitted by the IR illuminator of the depth-sensing camera.

In Step 318, a determination is made about whether the sync signal has been received. If no sync signal has been received, the method remains in Step 318. If a sync signal has been received, the method may proceed to Step 320. Step 318 thus gates the acquisition of a frame, based on the receipt of the sync signal. Executed repeatedly, the sync signal, detected in Step 318, thus governs the frame rate at which the video camera images the environment.

In Step 320, the video camera image sensor is read out to obtain a frame. In one embodiment of the invention, the readout is performed pixel row by pixel row. Accordingly, while the beginning of the first pixel row exposure time window may be aligned with the onset of the first illumination pulse, subsequent pixel row exposure time windows may follow with an increasing delay. In one embodiment of the invention, the delay from pixel row to pixel row is a fixed, image sensor specific characteristic that may not be modifiable. Importantly, however, the readout of the last pixel row, in accordance with an embodiment of the invention, is completed no later than when the last illumination pulse of the illumination pattern ends.

In Step 322, the exposure of the frame is further adjusted to approximate the desired frame exposure time. As previously noted, in Step 312, the actual frame exposure time has a granularity that is limited by the pulse period. The actual exposure time, in accordance with an embodiment of the invention, is therefore limited to multiples of the pulse period. Accordingly, depending on the pulse period, the selected actual frame exposure time may only be a coarse approximation of the desired frame exposure time. Further, background light (e.g. moonlight), in addition to the light provided by the illuminator, may result in a frame that is overexposed, if the calculation of the actual frame exposure time was based on the assumption that the only light source is the pulsed IR illuminator. To obtain an improved approximation or a match with the desired frame exposure time, in Step 322 the frame is therefore further processed. The processing may involve applying an additive and/or multiplicative gain (or a gain based on any other mathematical function) to upward or downward adjust the brightness of the pixels that form the image, to the level dictated by the desired frame exposure time. In one embodiment of the invention, the exposure adjustment may further be performed by adjusting the actual frame exposure time to be used for the subsequent capturing of the next frame. For example, as described in FIG. 4, the actual frame exposure time may be shortened if the image frame was found to be overexposed.

In Step 324, the frame is archived and/or transmitted to an additional party. Further additional processing such as format conversion, compression, buffering, etc. may be performed. After the execution of Step 324, the method may either return to Step 302 to obtain the next frame, or alternatively, if no additional frames are to be captured, the execution of the method may terminate.

FIG. 4 shows a method for obtaining the actual frame exposure time based on the desired frame exposure time, in accordance with an embodiment of the invention.

In Step 400, for the desired frame exposure time, obtained in Step 310, the nearest multiple of the illumination pulse on-time is determined. The nearest multiple of the illumination pulse on-time may be determined by rounding of the desired frame-exposure time or alternatively by upward or downward rounding to the nearest multiple of the illumination pulse on-time. The assumption underlying this operation is that the light that is to be received during the desired frame exposure time is received during the on-time intervals of the IR illuminator. Assume, for the scenario described in FIG. 2, in which the on-time is 1 ms and the off-time is 1.6 ms, that a desired frame exposure time is, for example, 4.3 ms. The execution of Step 400 thus results in the nearest multiple of the illumination pulse on-time being 4×1 ms=4 ms.

In Step 402, the actual frame exposure time is obtained for the nearest multiple of illumination pulse on-time. Because the actual frame exposure time is based on the illumination pulse period, including the illumination pulse on-time and the illumination pulse off-time, the actual frame exposure time is determined by finding the multiple of the illumination pulse period corresponding to the multiple of the illumination pulse on-time. In the above example, the actual frame exposure time is, thus, 4×(1 ms+1.6 ms)=10.4 ms.

In one embodiment of the invention, the maximal actual frame exposure time is limited to M−1 illumination pulse periods, as previously described with reference to FIG. 2. Further, the maximal actual frame exposure time is also limited by the requirement that for all pixel rows the readout must be completed prior to the end of the $M^{th}$ illumination pulse on-time interval. In other words, the actual pixel row exposure time window associated with the $N^{th}$ pixel row (i.e., the last pixel row of the image sensor being read out) must end no later than the last illumination pulse of the illumination pattern. If, based on the nearest multiple of the illumination pulse on-time, selected in Step 400, this condition is violated, a lower multiple of the illumination pulse on-time must be selected. Because the resulting actual frame exposure time may be shorter than desired, the image brightness may be increased in Step 322.

Those skilled in the art will recognize that the methods of FIGS. 3 and 4 may be modified such that the capturing of a single frame may span multiple consecutive illumination patterns. For example, if the actual frame exposure time, determined in Step 402, is considerably longer than the illumination pattern, the capturing of the frame may extend over two, subsequent illumination pattern, as necessary to capture an appropriate amount of light. As a result, the overall frame rate of the video camera may reduce, however. Specifically, for example, if the capturing of a single frame spans a first and extends into a second illumination pattern, rather than being limited to a single illumination pattern, the achievable frame rate is reduced by a factor two.

Figure 5:
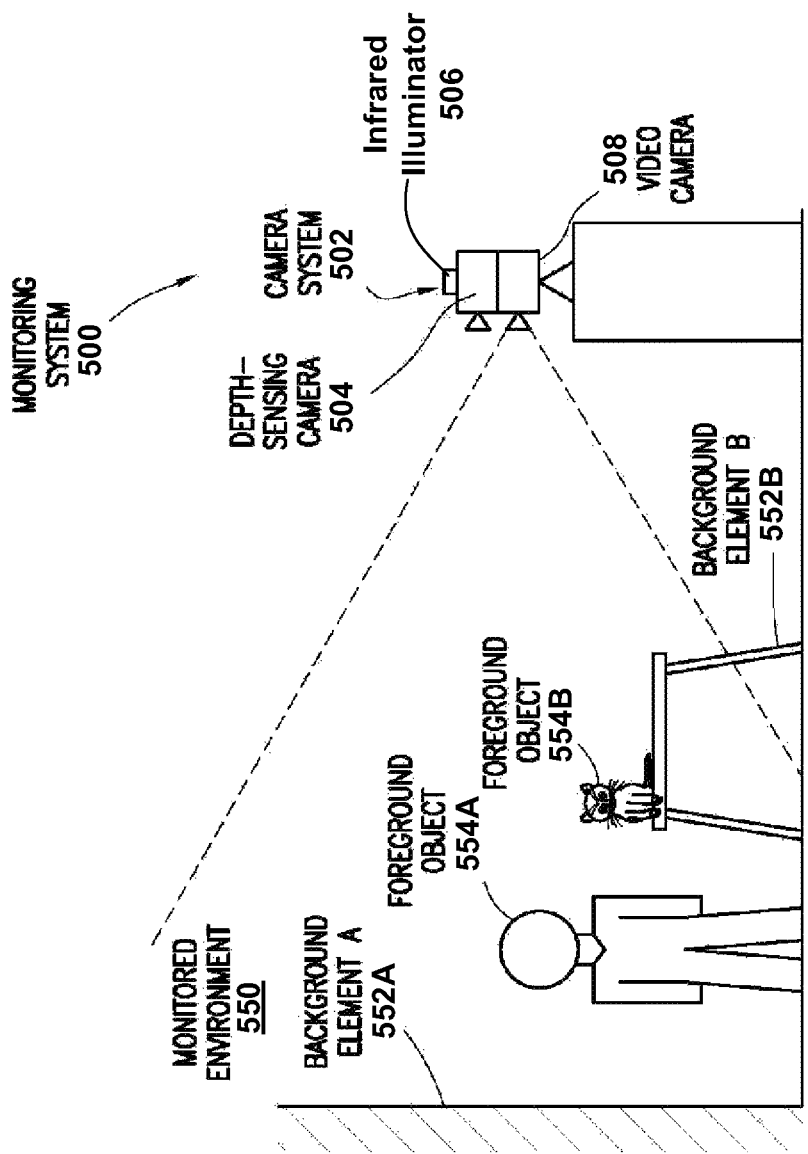
FIG. 5 shows an exemplary application of the camera system, in accordance with one or more embodiments of the invention.

The following describes a use case of one or more embodiments of the invention. The use case scenario described below is intended to provide an example of an application of the method and system for using light emissions by a depth-sensing camera to capture video images under low-light conditions. The use case scenario is based on the sample monitoring system setup (500), shown in FIG. 5, is for illustrative purposes only, and is not intended to limit the scope of the invention. The methods shown in FIGS. 3 and 4 are not limited to the setup of FIG. 5, but rather are universally valid for a wide range of applications.

FIG. 5 shows a monitoring system (500) in accordance with an embodiment of the invention. The monitoring system includes a camera system (502) equipped with a depth-sensing camera (504) and a video camera (508) to detect activity in a monitored environment (550). The monitored environment (550) includes background objects (552) such as a walls (552A), furniture (552B), etc. The monitored environment (550) may further include foreground objects such as a person (554A) and a pet (554B). In one embodiment of the invention, the depth-sensing camera (504) is configured to detect foreground objects based on motion in a three-dimensional workspace. A detected foreground object is then classified based on one or more classification criteria such as the size and shape of the object. The monitoring system may thus distinguish the person (554A) from the cat (554B).

Additional details regarding the monitoring system and the detection of objects in the monitored environment are provided in U.S. patent application Ser. No. 14/813,907 filed Jul. 30, 2015, the entire disclosure of which is hereby expressly incorporated by reference herein.

The depth-sensing camera (504) includes an infrared illuminator (506) that emits light based on the illumination pattern described in FIG. 2. Further, the video camera (508) is in spatial alignment with the depth-sensing camera (504), such that an object detected based on depth-data, by the depth-sensing camera, can be identified in the video images of the video camera.

Initially, assume that the monitored environment is exposed to sufficient daylight, such that the video camera uses its internal configuration to capture color images of the monitored environment. Although the depth sensing camera is operating simultaneously to the video camera, thus causing the infrared illuminator to emit light, this light does not affect the operation of the video camera because the IR cut filter is activated, and thus only visible light, but no IR light, is captured by the video camera.

Next, assume that FIG. 5 describes a scenario at night, when the ambient light is insufficient as the sole light source for the capturing of frames by the video camera. Thus, the IR cut filter is disabled, and IR light, emitted by the IR illuminator of the depth sensing camera, is relied upon as the primary light source, as described in FIGS. 2, 3 and 4. Initially, assume that no foreground object is detected by the depth sensing camera in the monitored environment, i.e., neither the person nor the cat is present in the monitored environment. Accordingly, a desired frame exposure time is selected based on an average desired exposure of the monitored environment. This choice of exposure results in a brightness range of the captured frame such that the entire monitored environment, including the background objects, are clearly visible.

Assume that the corresponding desired frame exposure time is 4.4 ms. Assuming an illumination pulse on-time of 1 ms and an illumination pulse off-time of 1.6 ms, the nearest multiple of the illumination pulse on-time is therefore 4 ms, and the resulting actual frame exposure time is 10.4 ms. The image sensor is read out when the sync signal (a trigger pulse) from the depth-sensing camera is received. No exposure adjustments are necessary, and the frame is thus archived as-is. The frame is artifact-free because all pixel rows were identically exposed during the 10.4 ms intervals that all included an identical 4 ms IR illuminator on-time.

Next, assume that a person enters the monitored environment. The person is detected by the depth-sensing camera and is successfully classified as a person. The desired frame exposure time is updated to properly expose the person in the frame to be captured, while ignoring the surrounding environment. The desired exposure time adjustment, in the example, is performed when the person first appears in a frame. Because the person, in comparison to the environment, is highly IR reflective, a shorter desired frame exposure time is selected. Continued use of the previously set desired frame exposure time of 4 ms would result in the person being overexposed with the pixel values associated with image regions in which the person is located being saturated. Assume that the desired frame exposure time is determined to be 2.1 ms. The nearest multiple of the illumination pulse on-time therefore is 2 ms, and the resulting actual frame exposure time is 5.2 ms. The frame is captured with the updated actual frame exposure time. In the resulting frame, the person is properly exposed, while the surrounding environment appears darker than when previously recorded using the 10.4 ms actual frame exposure time. The frame is, again, artifact-free because all pixel rows were identically exposed during the 5.2 ms intervals that all included an identical 2 ms IR illuminator on-time.

Embodiments of the invention enable the use of light emissions by a depth-sensing camera illuminator to capture video images under low-light conditions. Embodiments of the invention thus enable the cost-effective design of depth-sensing/video recording camera systems that only need a single light source. The elimination of a dedicated light source for the video camera not only reduces cost and enables new, compact mechanical designs of the camera system but also eliminates the possibility of interference of the video camera light source with the depth-sensing camera.

Figure 6:
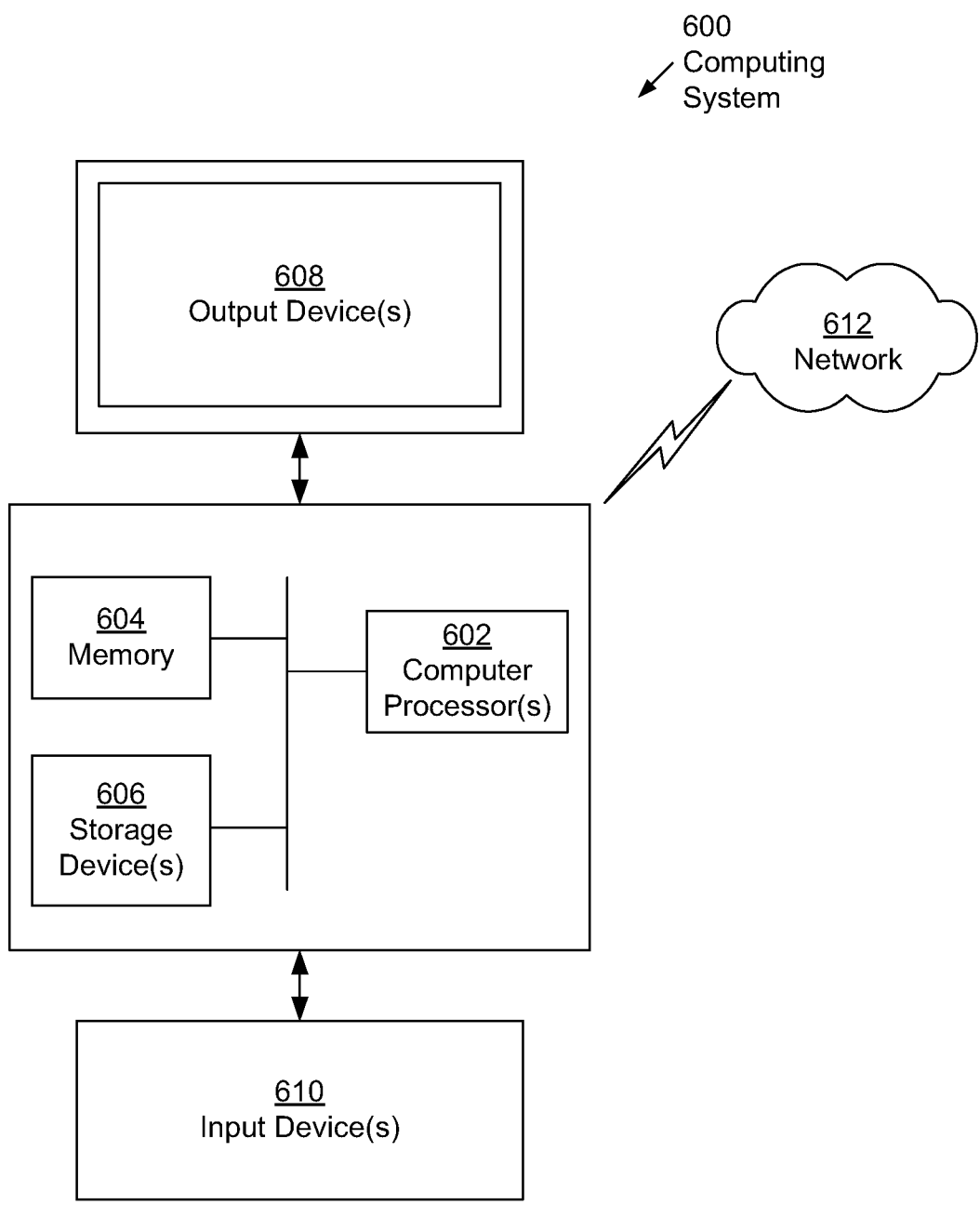
FIG. 6 shows a computing system, in accordance with one or more embodiments of the invention.

Embodiments of the technology may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (600) may be located at a remote location and connected to the other elements over a network (612). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for capturing video frames, comprising:
   obtaining a depth-data frame of an environment using a depth-sensing camera of a camera system, wherein the depth-sensing camera is equipped with an infrared illuminator, and wherein the environment is illuminated by an illumination pattern emitted by the infrared illuminator;
   obtaining, an infrared illuminator parameterization for the illumination pattern emitted by the infrared illuminator;
   making a determination that a lighting condition in the environment requires a video camera of the camera system to rely on light provided by the infrared illuminator;
   based on the determination:
   deactivating an infrared cut filter of the video camera;
   obtaining a desired frame exposure time, based on a desired frame exposure, wherein obtaining the desired frame exposure comprises one selected from a group consisting of:
   determining the desired frame exposure based on a desired average exposure of the frame, and
   determining the desired video frame exposure based on a desired exposure of an object in the frame, wherein the object is determined based on data from the depth-sensing camera;
   determining, based on the infrared illuminator parameterization and the desired frame exposure time, an actual frame exposure time; and after determining the actual frame exposure time, obtaining a frame of the environment using the actual frame exposure time using the infrared illuminator with the illumination pattern.

2. The method of claim 1, further comprising:
   adjusting an actual exposure of the frame to approximate the desired frame exposure.

3. The method of claim 1, further comprising:
   receiving a sync signal after determining the actual frame exposure time,
   wherein the frame is obtained after receiving the sync signal.

4. The method of claim 3, wherein the sync signal marks a beginning of the illumination pattern by the infrared illuminator.

5. The method of claim 1, wherein the illumination pattern comprises a plurality of illumination pulses, wherein each illumination pulse in the plurality of illumination pulses has an illumination pulse period comprising an illumination pulse on-time and an illumination pulse off-time.

6. The method of claim 5, wherein determining the actual frame exposure time comprises:
   for the desired frame exposure time, determining a nearest multiple of the illumination pulse on-time; and
   obtaining the actual frame exposure time from a multiple of the illumination pulse period corresponding to the nearest multiple of the illumination pulse on-time.

7. The method of claim 6,
   wherein the actual frame exposure time does not exceed M−1 illumination pulse periods, and
   wherein M is the cardinality of the plurality of illumination pulses.

8. The method of claim 1, wherein the use of the actual frame exposure time for obtaining a frame substantially eliminates an uneven exposure of regions in the frame.

9. A system for capturing video frames, the system comprising: a depth-sensing camera equipped with an infrared illuminator; the infrared illuminator configured to emit an illumination pattern that illuminates
   an environment, enabling the capturing of a depth-data frame by the depth sensing camera;
   an imaging control engine configured to: obtain an infrared illuminator parameterization of the infrared illuminator;
   make a determination that a lighting condition in the environment requires a video camera to rely on light provided by the infrared illuminator; based on the determination:
   deactivate an infrared cut filter of a video camera of the camera system; obtain a desired frame exposure time, based on a desired frame exposure, wherein obtaining the desired frame exposure comprises one selected from a group consisting of:
   determining the desired frame exposure based on a desired average exposure of the frame, and determining the desired video frame exposure based on a desired exposure of an object in the frame, wherein the object is determined based on data from the depth sensing camera;
   determine, based on the infrared illuminator parameterization and the desired frame exposure time, an actual frame exposure time; and the video camera configured to obtain a frame using the actual frame exposure time, using the infrared illuminator with the illumination pattern.

10. The system of claim 9, wherein the imaging control engine is further configured to adjust an actual exposure of the frame to approximate the desired frame exposure.

11. The system of claim 9, wherein the video camera is further configured to:
    receive a sync signal after determining the actual frame exposure time; and
    obtain the frame after receiving the sync signal.

12. The system of claim 11, wherein the sync signal marks a beginning of the illumination pattern by the infrared illuminator.

13. The system of claim 9, wherein the illumination pattern comprises a plurality of illumination pulses,
    wherein each illumination pulse in the plurality of illumination pulses has an illumination pulse period comprising an illumination pulse on-time and an illumination pulse off-time.

14. The system of claim 13, wherein determining the actual frame exposure time comprises:
  for the desired frame exposure time, determining a nearest multiple of the illumination pulse on-time; and
  obtaining the actual frame exposure time from a multiple of the illumination pulse period corresponding to the nearest multiple of the illumination pulse on-time.

15. The system of claim 14,
  wherein the actual frame exposure time does not exceed M−1 illumination pulse periods, and
  wherein M is the cardinality of the plurality of illumination pulses.

16. The system of claim 9, wherein the depth-sensing camera comprises a time-of-flight depth sensor.

17. A non-transitory computer-readable medium (CRM) comprising instructions that enable a system for capturing video frames to:
  obtain a depth-data frame of an environment using a depth-sensing camera,
wherein the depth-sensing camera is equipped with an infrared illuminator,
  wherein the environment is illuminated by an illumination pattern emitted by infrared illuminator;
  obtain an infrared illuminator parameterization for the illumination pattern emitted by the infrared illuminator;
  make a determination that a lighting condition in the environment requires the camera system to rely on light provided by the infrared illuminator; based on the determination: deactivate an infrared cut filter of a video camera;
  obtain a desired frame exposure time, based on a desired frame exposure,
wherein obtaining the desired frame exposure comprises one selected from a group consisting of:
  determining the desired frame exposure based on a desired average exposure of the frame, and determining the desired video frame exposure based on a desired exposure of an object in the frame, wherein the object is determined based on data from the depth-sensing camera;
  determine, based on the infrared illuminator parameterization and the desired frame exposure time, an actual frame exposure time; and after determining the actual frame exposure time, obtain a frame using the actual frame exposure time using the infrared illuminator with the illumination pattern.

18. The non-transitory CRM of claim 17, wherein the instructions further enable the system to:
  receive a sync signal after determining the actual frame exposure time,
  wherein the frame is obtained after receiving the sync signal.

19. The non-transitory CRM of claim 17,
  wherein the illumination pattern comprises a plurality of illumination pulses, and
  wherein each illumination pulse in the plurality of illumination pulses has an illumination pulse period comprising an illumination pulse on-time and an illumination pulse off-time.

20. The non-transitory CRM of claim 19, wherein determining the actual frame exposure time comprises:
  for the desired frame exposure time, determining a nearest multiple of the illumination pulse on-time; and
  obtaining the actual frame exposure time from a multiple of the illumination pulse period corresponding to the nearest multiple of the illumination pulse on-time.

\* \* \* \* \*